(12) United States Patent
Schmidt et al.

(10) Patent No.: US 12,031,439 B2
(45) Date of Patent: Jul. 9, 2024

(54) OUTRUNNER GAS EXPANSION MOTOR TOPOLOGY

(71) Applicant: Safran Landing Systems Canada Inc., Ajax (CA)

(72) Inventors: Robert Kyle Schmidt, Brooklin (CA); Steve Amberg, Toronto (CA)

(73) Assignee: Safran Landing Systems Canada Inc., Ajax (CA)

( * ) Notice: Subject to any disclaimer, the term of this patent is extended or adjusted under 35 U.S.C. 154(b) by 172 days.

(21) Appl. No.: 17/745,149

(22) Filed: May 16, 2022

(65) Prior Publication Data

US 2023/0366315 A1   Nov. 16, 2023

(51) Int. Cl.
  *F01C 1/356*  (2006.01)
  *B64C 25/32*  (2006.01)

(52) U.S. Cl.
  CPC .......... *F01C 1/3562* (2013.01); *B64C 25/405* (2013.01)

(58) Field of Classification Search
  CPC ....... B64C 25/405; B64C 25/22; F01C 1/332; F01C 1/3562
  See application file for complete search history.

(56) References Cited

U.S. PATENT DOCUMENTS

| | | | | |
|---|---|---|---|---|
| 440,120 | A * | 11/1890 | Forsythe | F01C 1/3562 418/8 |
| 2,435,827 | A * | 2/1948 | Greubel | B64C 25/405 418/175 |
| 2,891,482 | A * | 6/1959 | Stanislao | F04C 2/348 418/257 |
| 2,899,940 | A * | 8/1959 | Gibbs | F01C 1/344 418/152 |
| 2,969,743 | A * | 1/1961 | Stanislao | F01C 1/348 418/173 |
| 6,450,448 | B1 * | 9/2002 | Suzuki | B64C 25/405 244/103 S |
| 2010/0065678 | A1 * | 3/2010 | Kiyosawa | B64C 25/405 244/50 |
| 2015/0017042 | A1 * | 1/2015 | Landrum | F03C 2/304 29/888.025 |
| 2015/0314859 | A1 | 11/2015 | Blanpain et al. | |
| 2015/0314863 | A1 * | 11/2015 | Ehrhart | B64C 25/34 244/50 |
| 2016/0340032 | A1 | 11/2016 | Daffos | |
| 2017/0121013 | A1 * | 5/2017 | Christensen | B64C 25/42 |

OTHER PUBLICATIONS

Schmidt, R.K., "Pyrotechnic Wheel Acceleration System," U.S. Appl. No. 17/160,202, filed Jan. 27, 2021, 21 pages.

* cited by examiner

*Primary Examiner* — Jason H Duger
(74) *Attorney, Agent, or Firm* — CHRISTENSEN O'CONNOR JOHNSON KINDNESS PLLC

(57) ABSTRACT

A motor is configured to apply a rotational force to a wheel that includes a rim rotatably mounted to an axle about a first axis. The motor has a rotor coupled to the rim. The rotor has an interior cavity and a plurality of radial slots formed therein. A cylindrical stator is disposed within the cavity and has a second axis offset from the first axis. The stator is fixed in rotation relative to the axle. The motor further includes a plurality of vanes, each vane being slidably disposed within one of the plurality of radial slots. A compressed gas source is in fluid communication with the cavity and selectively provides compressed gas to the cavity to rotate the rotor.

15 Claims, 8 Drawing Sheets

OUTRUNNER GAS EXPANSION MOTOR TOPOLOGY

BACKGROUND

Most aircraft are equipped with landing gear that enables travel on the ground during takeoff, landing, and taxiing phases. These landing gear comprise a plurality of wheels, which may be arranged according to configurations varying from one aircraft to another. For takeoff, aircraft traditionally rely on main engine thrust in order to reach takeoff speed.

Aircraft with low engine thrust and relatively high overall mass have lengthy takeoff distances, as it takes a long time for the low thrust to accelerate the aircraft to takeoff speed. Although this combination is often acceptable, for instance with long endurance aircraft and self-launching gliders, in many cases the long takeoff distance is not desirable. Indeed, there are times when operation from reduced runway lengths is necessary—such as the operation of aircraft from aircraft ship decks or when operating from improvised airfields of limited length. While catapults and other such mechanisms effectively reduce takeoff distance, such solutions are not always available. Thus, a means of reducing the takeoff length is desired.

Wheel drive systems have been proposed to assist with taxiing, and in some cases to assist aircraft with takeoff. One known wheel drive system is set forth in US Patent Publication No. 2015/0314859, which is assigned to Safran Landing Systems. Such a system proposes an undercarriage leg supporting an electric drive actuator, which drives rotation of a landing gear wheel via a reduction gearset. Another known electrical drive system is set forth in US Patent Publication No. 2016/0096619, also assigned to Safran Landing Systems. While these systems are well-suited to taxiing applications, they are not well suited to the task of quickly accelerating an aircraft to takeoff speeds, except potentially for very lightweight aircraft. For weight and space reasons, such known systems cannot scale in order to deliver the torque and power necessary to accelerate even modestly sized aircraft from a ship deck or improvised runway, even with the assistance of main engine thrust.

Accordingly, there is a continuing need in the industry for improved means of reducing the takeoff length through an aircraft mounted system.

SUMMARY

The present disclosure provides examples of a gas-expansion motor to provide high-speed, high-torque rotational force to a wheel. In an embodiment, a motor is configured to apply a rotational force to a wheel that includes a rim rotatably mounted to an axle about a first axis. The motor has a rotor coupled to the rim. The rotor has an interior cavity and a plurality of radial slots. A cylindrical stator is disposed within the cavity and has a second axis offset from the first axis. The stator is fixed in rotation relative to the axle. The motor further includes a plurality of vanes, each vane being slidably disposed within one of the plurality of radial slots. A compressed gas source is in fluid communication with the cavity and selectively provides compressed gas to the cavity to rotate the rotor.

In any embodiment, the cavity comprises a cylindrical surface coaxial with the first axis.

In any embodiment, each vane is configured to maintain contact with the stator.

In any embodiment, the plurality of vanes divide the cavity into a plurality of chambers, each chamber being fluidly isolated from the other chambers.

In any embodiment, the stator comprises an inlet in fluid connection with the compressed gas source and the cavity.

In any embodiment, the stator comprises at least one outlet configured to exhaust the compressed gas from the cavity.

In any embodiment, the compressed gas source comprises a pyrotechnic unit configured to generate expanding gases by combusting a propellant.

In any embodiment, the propellant is contained in a pyrotechnic cartridge configured to be jettisoned after the propellant is combusted.

In any embodiment, the rotor comprises a plurality of external rotor splines engaging a plurality of internal rim splines formed on the rim.

In any embodiment, the stator comprises a plurality of internal splines engaging a plurality of external axle splines formed on the axle.

In any embodiment, the stator is positioned between an annular inboard stator plate and an annular outboard stator plate, the inboard stator plate and outboard stator plate being configured to be fixed in rotation relative to the first axis.

In any embodiment, the rotor is positioned between an annular inboard rotor plate and an annular outboard rotor plate, the inboard rotor plate and outboard rotor plate being configured to rotate about the first axis with the rim, wherein the inboard rotor plate surrounds the inboard stator plate, and the outboard rotor plate surrounds the outboard stator plate.

In any embodiment, the inboard rotor plate sealingly engages the inboard stator plate, and the outboard rotor plate sealingly engages the outboard stator plate.

In any embodiment, the vanes are positioned between an inboard edge and an outboard edge of the rim.

In any embodiment, the motor is part of an aircraft having a landing gear with a wheel having a rim rotatably mounted to an axle about a first axis This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The present disclosure relates to aircraft-mounted wheel acceleration systems, in addition to aircraft landing gear systems and aircraft equipped with such wheel acceleration systems. The wheel acceleration systems of the present disclosure are aircraft-mounted systems configured to assist with the acceleration of the aircraft to takeoff speeds, for example with the assistance of main engine thrust. In other words, the power delivered by the wheel acceleration systems and main engine thrust together accelerate the aircraft to takeoff speeds. Such systems have wide applicability to commercial and military aircraft. Advantageously, such wheel acceleration systems effectively reduce takeoff distance, which can enable aircraft to operate from aircraft ship decks and/or improvised runways.

Figure 1:
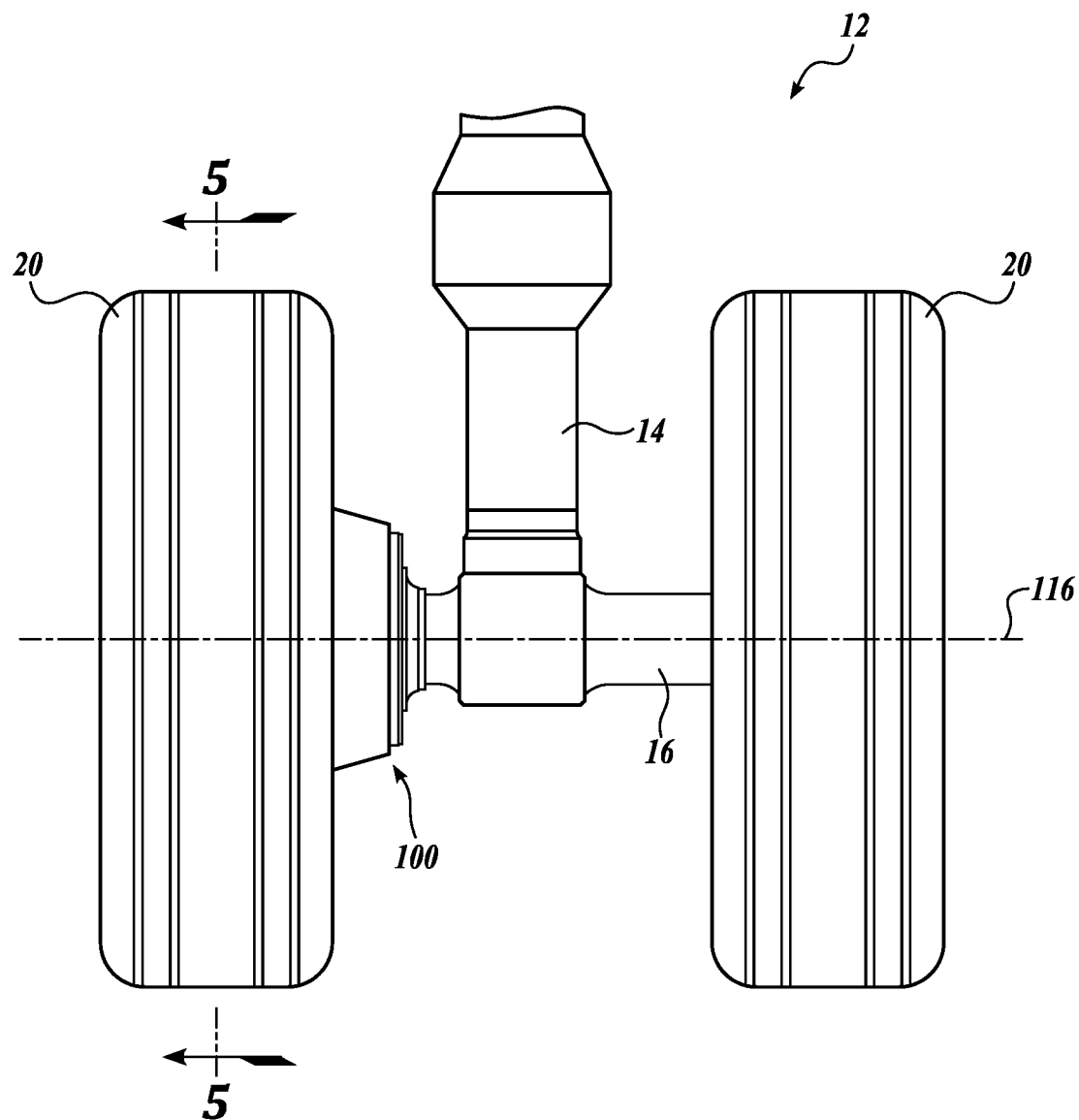
FIG. 1 shows a front view of a representative embodiment of a landing gear system with a motor that drives rotation of the wheel according to the present disclosure.
Figure 2:
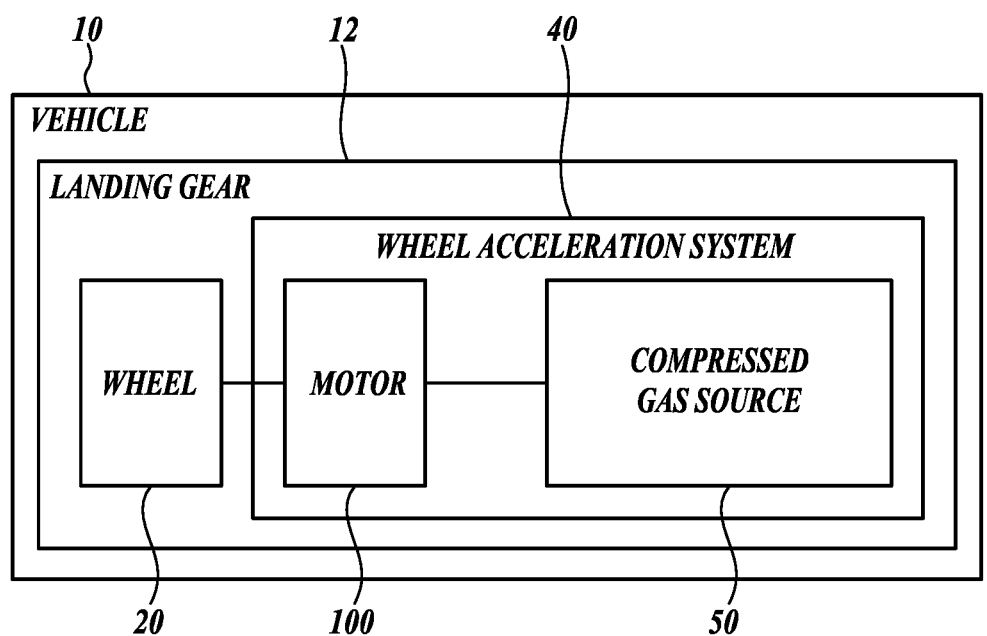
FIG. 2 shows a schematic view of a vehicle with the landing gear system of FIG. 1.

FIGS. 1 and 2 show a representative embodiment of a landing gear system 12 for a vehicle 10 according to the present disclosure. As shown in FIG. 1, the landing gear system 12 includes a strut 14 and an axle assembly 16. One end of the strut 14 is coupled to the vehicle 10, such as an aircraft, and the other end of the strut 14 is coupled to the axle assembly 16. In the illustrated embodiment, the axle assembly 16 extends laterally outward from the strut 14, and a wheel 20 is rotatably mounted about an axis 116 at each end of the axle assembly 16. As will be further described below, the landing gear 12 further includes a wheel acceleration system 40 that includes a motor 100, such as a vane motor, coupled to one or more of the wheels 20 and also a compressed gas source 50 that selectively provides compressed gas to drive the vane motor 100.

Figure 3:
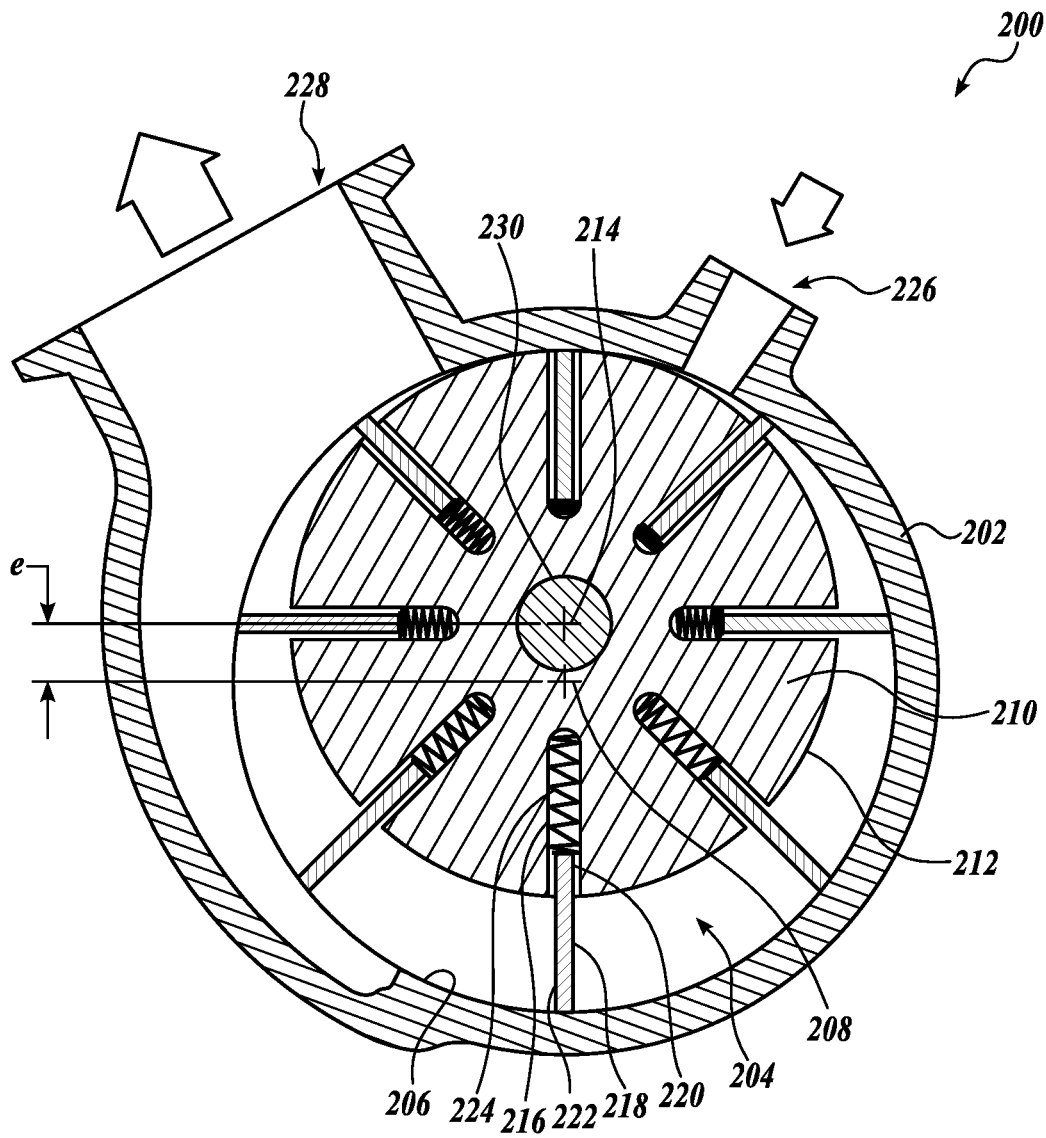
FIG. 3 shows a cross-sectional view of a known vane motor.
Figure 4:
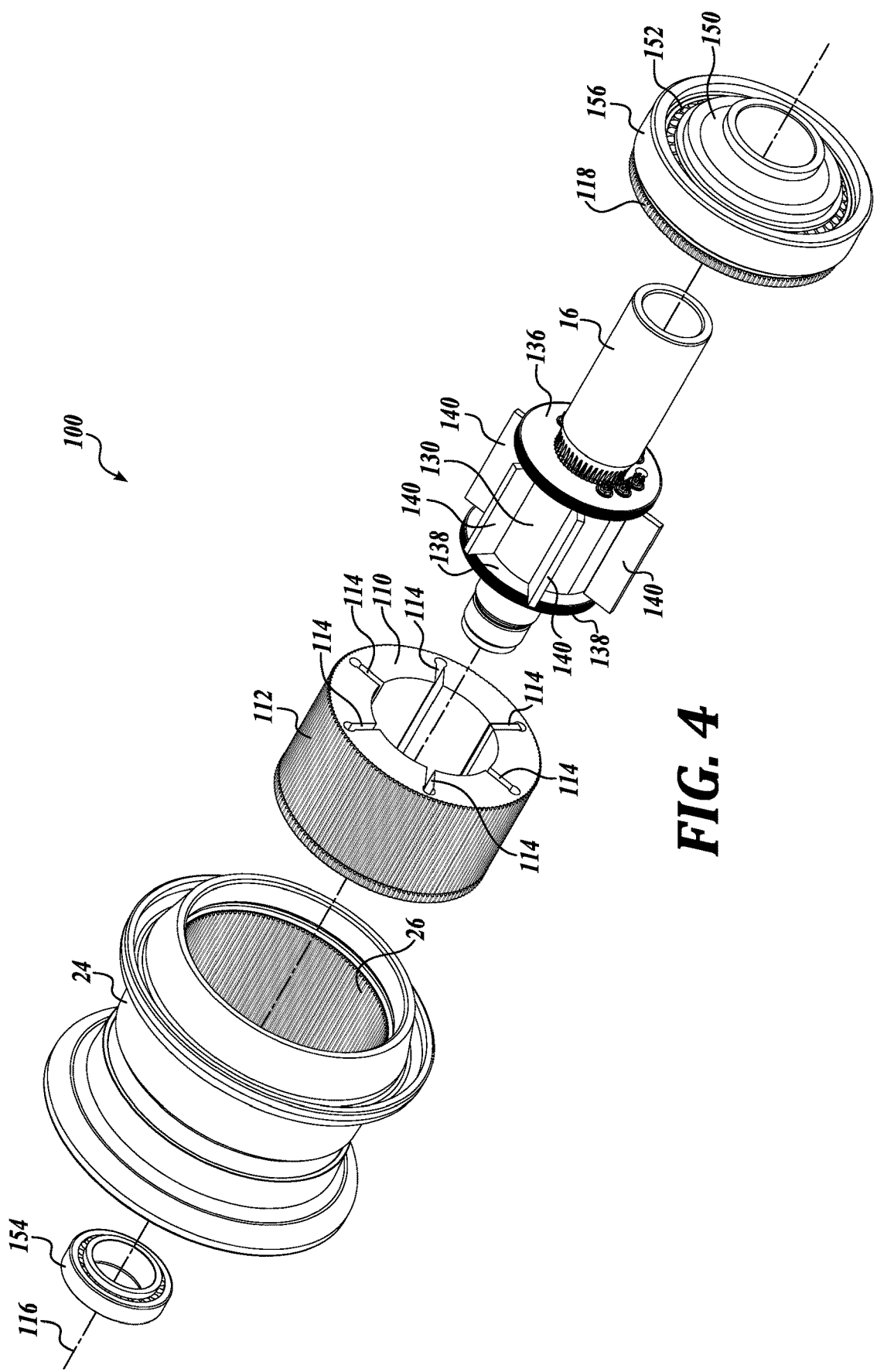
FIG. 4 shows a partial exploded view of the landing gear system of FIG. 1.

FIG. 3 shows a known vane motor 200 that uses compressed gas to generate rotary motion. The motor 200 includes a housing that acts as a stator 202. A cylindrical inner surface 206 with a central axis 208 defines a cavity within the stator 202. A rotor 210 with a cylindrical outer surface 212 is rotatably mounted about an axis 214 within the cavity of the stator 202. The axis 214 of the rotor 210 is parallel to and offset from the axis 208 of the cavity by a distance (e) so that to the outer surface 212 of the rotor 210 and the inner surface 206 of the stator 202 define a crescent-shaped chamber 204.

A plurality of radial slots 216 are formed in the rotor 210. A vane 218 is slidably disposed within each slot 216. The vane 218 extends radially outward so that an inner end 220 of the vane 218 remains disposed within the corresponding slot 216, while an outer end 222 of the vane 218 contacts the inner surface 206 of the stator 202. As a result, the vanes 218 divide the chamber 204 into separate working chambers having different sizes.

An inlet 226 extends through the stator 202 and is configured to introduce a compressed fluid from a compressed fluid source (not shown) into the chamber 204. The compressed fluid applies a force against the vanes 218 within each working chamber to drive rotation of the rotor 210 about axis 214. As the rotor 210 rotates about axis 214, the individual working chambers also move about axis 214 and come into fluid communication with an outlet 228 through which the fluid is discharged. An output shaft 230 is fixedly coupled to the rotor 210 so that the rotation of the rotor 210 by the compressed fluid drives rotation of an output shaft 230 about axis 214.

In the illustrated embodiment, a spring 224 is disposed in each slot 216 and applies a radially biasing force to the corresponding vane 218 so that the outer end 222 of the vane maintains contact with the inner surface 206 of the stator 202. In some embodiments, centrifugal force and/or compressed fluid bias the vanes 218 radially outward in addition to or in lieu of the illustrated springs.

While the illustrated vane motor 200 can be used to provide rotational force drive a wheel of a landing gear, such as the landing gear 12 shown in FIG. 2, coupling the output shaft 230 to the wheel 20 requires additional space and adds weight to the aircraft. Space within an aircraft landing gear bay is typically limited, and additional weight increases operating costs and reduces aircraft performance.

FIGS. 4-7 show an embodiment of a motor 100 suitable to drive rotation of a vehicle wheel and, in particular, a wheel 20 of the landing gear 12 of the aircraft 10, such as the landing gear shown in FIGS. 1 and 2. Embodiments of the motor 100 provide a compact, lightweight system that utilizes compressed fluid to drive the wheel 20.

Figure 6:
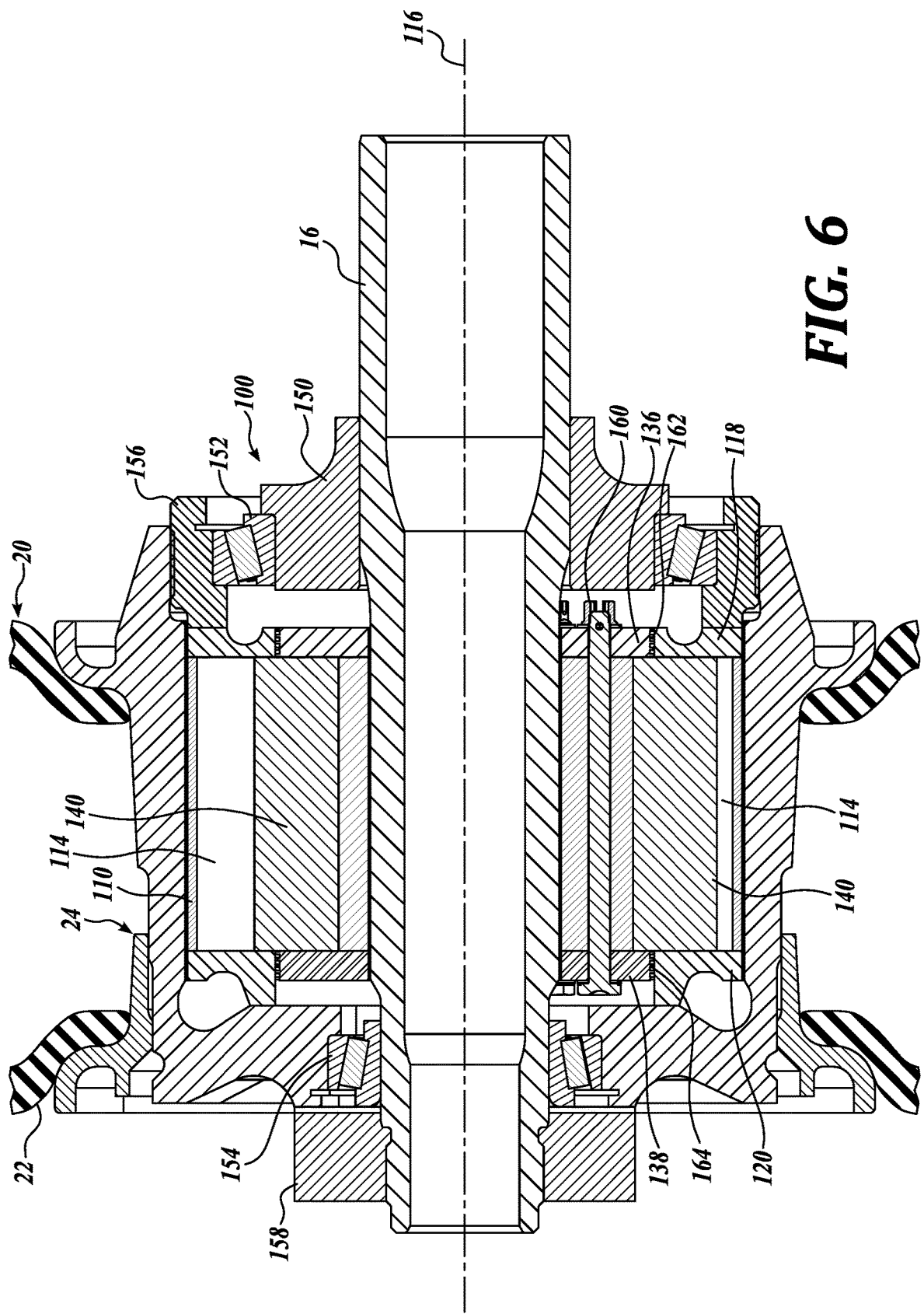
FIG. 6 shows a partial cross-sectional view of the landing gear system of FIG. 6.
Figure 7:
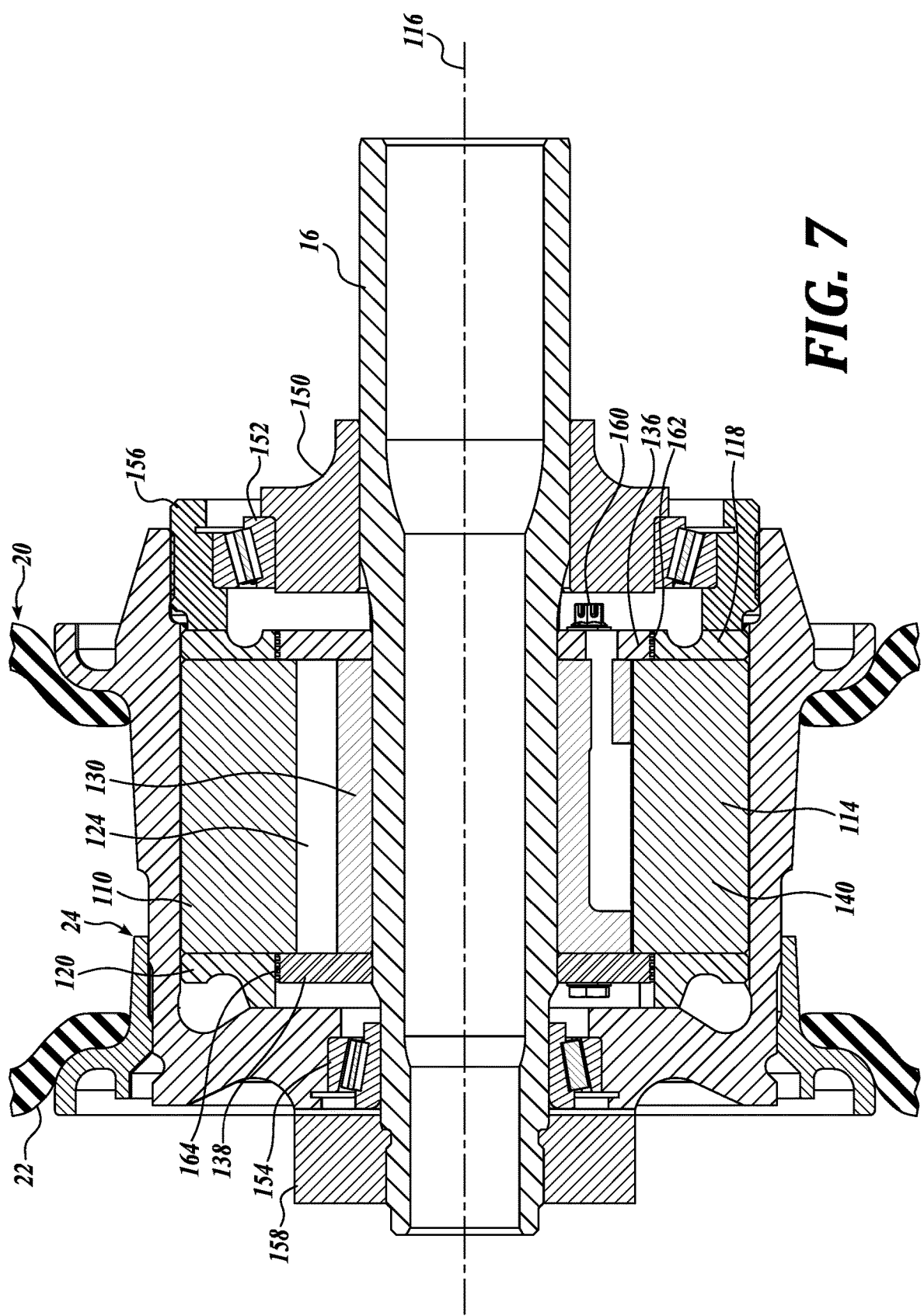
FIG. 7 shows another partial cross-sectional view of the landing gear system of FIG. 6.

As best shown in FIGS. 6 and 7, the wheel 20 includes a rim 24 with a pneumatic tire 22 mounted thereto. The rim 24 is rotatably mounted about axis 116 to the axle assembly 16 by an inboard thrust bearing 152 and an outboard thrust bearing 154. As will be explained in further detail, the motor 100 engages the rim 24 to drive rotation of the wheel 20 about the axis 116 of the axle assembly 16.

Figure 5:
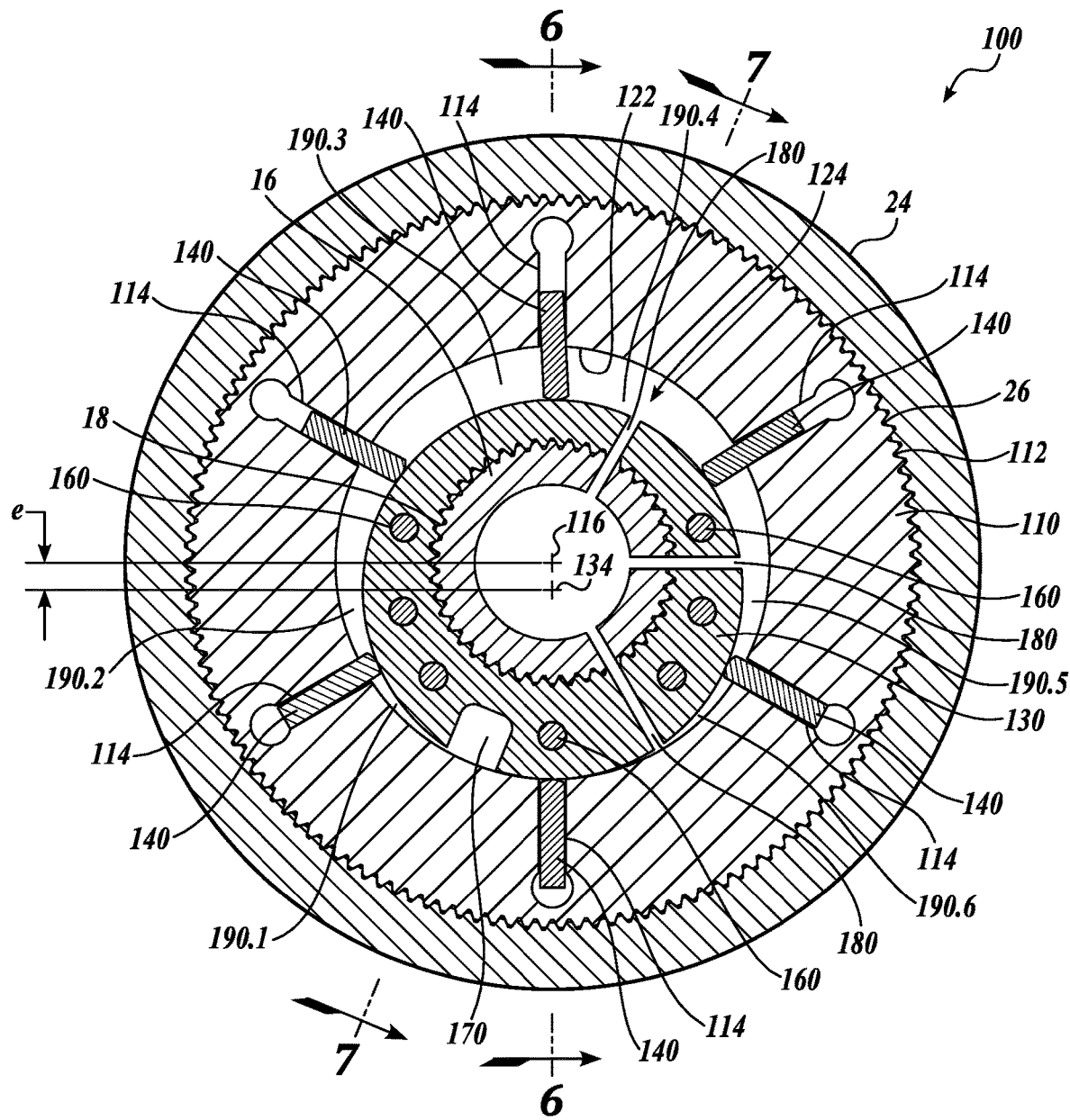
FIG. 5 shows a partial cross-sectional view of the landing gear system of FIG. 1.

Referring now to FIG. 5, the motor 100 includes a stator 130 fixedly mounted in rotation to the axle assembly 16. In an embodiment, the stator 130 has a plurality of internal splines 132 that engage a plurality of external splines 18 formed on the axle assembly 16 to prevent rotation of the stator 130 relative to the axle assembly 16. The stator 130 has a generally cylindrical shape and is eccentrically mounted to the axle assembly 16. That is, the stator 130 has a central axis 134 that is parallel to and offset from the central axis 116 of the axle assembly 16 by a distance e.

As shown in FIGS. 6 and 7, an annular inboard stator plate 136 is mounted to the axle assembly 16 inboard of and adjacent to the stator 130, and an annular outboard stator plate 138 is mounted to the axle assembly 16 outboard and adjacent the stator. A plurality of fasteners 160 extend through the inboard stator plate 136, stator 130, and outboard stator plate 138 in an axial direction to couple the stator and stator plates to each other. As a result, the stator 130 and stator plates 136 and 138 are all fixed in rotation about axis 116 relative to the axle assembly 16. In some embodiments, one or both of the stator plates 136 and 138 include internal splines that engage the external splines 18 of the axle assembly 16 to further resist rotation relative to the axle assembly.

Referring again to FIG. 5, the motor 100 further includes a cylindrical rotor 110 mounted to the rim 24. In some embodiments, external splines 112 on the rotor 110 engage internal splines 26 formed on the rim 24 so that the rotor 110 is fixed in rotation relative to the rim about axis 116. That is, the rotor 110 and the rim 24 are operatively connected to rotate in unison about the axis 116 of the axle assembly 16.

As shown in FIGS. 6 and 7, an annular inboard rotor plate 118 is mounted to the rim 24 inboard of and adjacent to the rotor 110, and an annular outboard rotor plate 120 is mounted to the rim 24 outboard and adjacent the rotor 110. In some embodiments, like the rotor 110, the rotor plates 118 and 120 include external splines that engage internal splines 26 formed on the rim so that the rotor 110, inboard rotor plate 118, and outboard rotor plate 120, all rotate in unison with the rim 24 about the axis 116 of the axle assembly 16.

The inboard rotor plate 118 surrounds the inboard stator plate 136, and a dynamic seal 162 is disposed between the inboard rotor plate 118 and the inboard stator plate 136. The dynamic seal 162 maintains sealing engagement between the inboard rotor plate 118 and the inboard stator plate 136 as the inboard rotor plate 118 rotates about the axle assembly 16 with the rim 24 and the inboard stator plate 136 remains fixed in rotation about the axle assembly 16. Similarly, outboard rotor plate 120 surrounds the outboard stator plate 138, and a dynamic seal 164 is disposed between the outboard rotor plate 120 and the outboard stator plate 138. The dynamic seal 164 maintains sealing engagement between the outboard rotor plate 120 and the outboard stator plate 138 as the outboard rotor plate 120 rotates about the axle assembly 16 with the rim 24 and the outboard stator plate 138 remains fixed in rotation about the axle assembly 16.

Still referring to FIGS. 6 and 7, a nut 156 threadedly engages an interior threaded portion of the inboard side of the rim 24. The nut 156 also contacts an inboard side of the inboard rotor plate 118, and a portion of the rim 24 contacts an outboard portion of the outboard rotor plate 120. Accordingly, the nut 156 and the rim 24 cooperate to retain the axial position of the rotor 110 (relative to the rim 24), which is disposed between the rotor plates 118 and 120.

As shown in FIG. 7, a portion of the rotor 110 is disposed between the inboard stator plate 136 and outboard stator plate 138. As previously noted, the inboard and outboard stator plates 136 and 138 are fixedly positioned relative to each other by virtue of being fastened to the inboard and outboard ends, respectively, of the stator 130. As a result, engagement of the rotor 110 with the inboard and outboard stator plates 136 and 138 limits the axial position of the stator plates 136 and 138 and the stator 130 relative to the axis assembly 16.

Referring again to FIGS. 6 and 7, the inboard thrust bearing 152 has an outer race in contact with the rim 24 and an inner race in contact with an annular spacer 150 mounted to the axle assembly 16. The outboard thrust bearing 154 has an outer race in contact with the rim 24 and an inner race in contact with the axle assembly 16. An outboard nut 158 threadedly engages the axle assembly 16 and maintains contact with the rim 24 such that the outboard nut 158 and the spacer 150 cooperate to maintain the axial position of the rim 24 relative to the axle assembly 16. Thus, the thrust bearings 152 and 154 provide for rotation of the rim 24 about axis 116 relative to the axle assembly 16. As the rim 24 rotates about the axle assembly 16, the rotor 110, inboard rotor plate 118, and outboard rotor plate 120 rotate with the rim 24.

As shown in FIG. 5, a plurality of radial slots 114 extends radially outward from the inner surface 122 of the rotor 110. A vane 140 is slidingly disposed within each slot and is sized to remain at least partially disposed with in the corresponding slot 114 when in contact with the stator 130. The vanes 140 are configured to maintain contact with the stator 130 as the rim 24 and rotor 110 rotate about the axle assembly 16. In some embodiments, a biasing element, such as a spring, is disposed within the slot 114 radially outward of the vane 140 and is configured to apply a biasing force to the vane so that the vane maintains contact with the stator 130. In some embodiments, a pressurized gas is introduced into the slot 114 radially outward of the vane 140 so that the pressure of the gas biases the vane radially inward to maintain contact with the stator 130. These and other suitable configurations for maintaining contact between the vanes 140 and the stator 130 are contemplated and should be considered within the scope of the present disclosure.

The vanes 140 contact the stator 130 to divide the cavity 124 into chambers 190.1 through 190.6 (referred to generically as 190.X). During operation of the motor 100, the rotor 110 and vanes 140 rotate relative to the stator 130 about axis 116. As the vanes 140 move around axis 116, the chambers 190.1 through 190.6 also move around the stator 130. Due to the eccentricity of the stator 130, the size of each chamber 190.X changes according to its position relative to the stator 130. For example, chamber 190.1 increases in size as it moves toward the position of chamber 190.3 (clockwise in FIG. 5). The size of the chamber 190.1 is then reduced as the chamber moves toward the position of chamber 190.3.

An inlet 170 is formed in the stator 130 and is in fluid communication with whichever chamber 190.X is adjacent to the inlet 170 at a given time. The inlet 170 is also in fluid communication with the compressed gas source 50, which selectively provides high-pressure gas to the adjacent chamber 190.X.

One or more outlets 180 are formed in the stator 130 to release the compressed gas from a chamber 190.X when that chamber moves through a position in which the chamber is in fluid communication with an outlet 180. In some embodiments, the outlets 180 vent to atmosphere through the axle assembly 16, the rim 24, the spacer 150 or any suitable structure.

Still referring to FIG. 5, operation of the motor 100 will now be described. To operate the motor 100, the compressed gas source 50 discharges a compressed gas through the inlet 170 into chamber 190.1. The compressed gas exerts a pressure on the corresponding vanes 140 that rotates the rotor 110 in a clockwise direction about axis 116 (as viewed in FIG. 5). As the rotor 110 rotates, the volume of the chamber 190.1 increases, and the compressed gas within the chamber 190.1 expands.

As the chamber 190.1 moves from the position of chamber 190.3 to 190.6 (as viewed in FIG. 5), the volume of the chamber 190.1 decreases. The decreasing volume of the chamber 190 forces the now expanding gas out of the one or more outlets 180 and is vented to the atmosphere.

The continued supply of compressed gas to the motor 100 rotates the rotor 110 about axis 116. The nested and splined coupling of the rotor 110 with the rim 24 transfers torque from the rotating rotor 110 to the wheel 20 and, more specifically, to the rim 24. Unlike the known vane motor 200 shown in FIG. 3, in which the stator 202 surrounds the rotor 210, the stator 130 of the disclosed motor 100 is positioned within the rotor 110. Accordingly, the presently disclosed motor 100 provides a simplified, lighter, and more compact connection to the wheel as compared to known vane motors, which require a coupling between an output shaft of the motor and the wheel.

Figure 8:
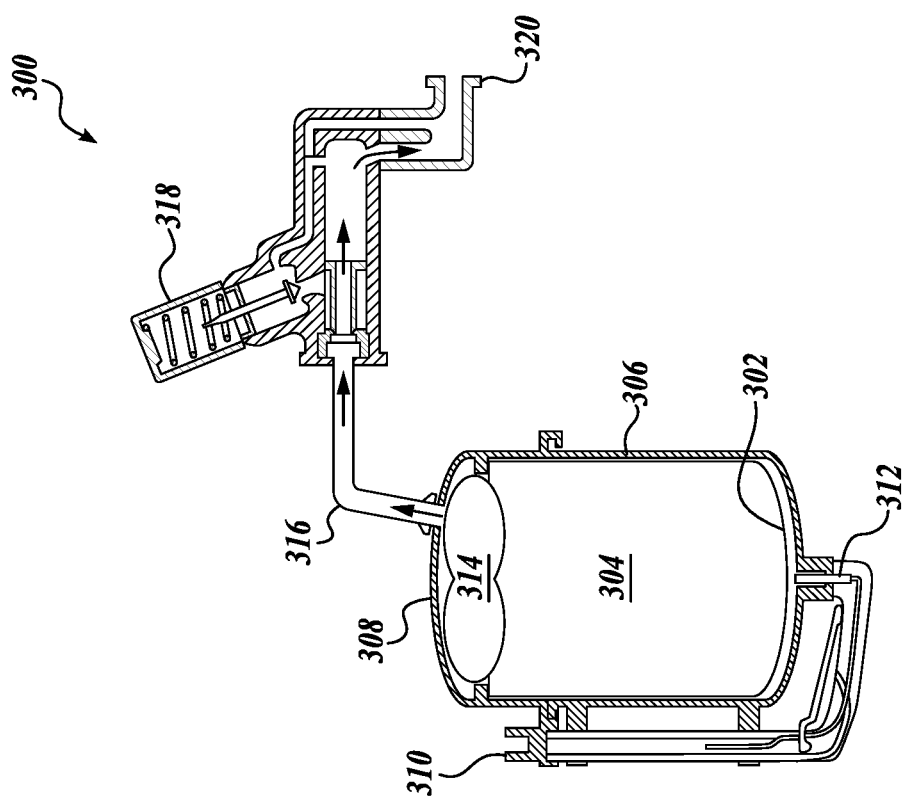
FIG. 8 shows a schematic view of an embodiment of the compressed gas source shown in FIG. 2.

Embodiments of the disclosed motor 200 utilize a compressed gas source 50 to drive rotation of the rotor 110 and, thus, the wheel 20. It will be appreciated that various compressed gas sources can be utilized and should be considered within the scope of the present disclosure. Referring to FIG. 8, an embodiment of a compressed gas source 50 is a pyrotechnic unit 300. The pyrotechnic unit 300 is configured to generate expanding gases by combusting a propellant, wherein the expanding gases from the pyrotechnic unit 300 drive rotary motion in the motor 100, and thus, the wheel 20.

The pyrotechnic unit 300 is configured to utilize a pyrotechnic cartridge 302, which is separate from the pyrotechnic unit 300 in the illustrated embodiment, but in some embodiments forms part of the pyrotechnic unit 300. The pyrotechnic cartridge 302 includes an outer casing or shell which contains within it a propellant 304, e.g., a solid or liquid fuel. Representative solid propellants include ammonium nitrate-based propellants suspended in a combustible binder. Representative liquid propellants include hyrdrazine, red nitric acid and jet fuel, and the like. Representative pyrotechnic cartridges 302 include MXU-4A and MXU-4A/A starting cartridges, formerly manufactured by Talley Industries, Inc. of Mesa, Arizona. Whether the propellant 304 is a solid or liquid fuel, its characteristics (e.g., grain composition, size, concentration, chemistry, and/or distribution) can be adjusted to achieve a desired burn rate, gas volume, gas temperature, and other pyrotechnic performance parameter. In some embodiments, the pyrotechnic cartridge 302 includes an integrated ignitor, e.g., an electro-explosive device.

A breech 306 forms a pressure vessel configured to receive the pyrotechnic cartridge 302 and is selectively sealed by a breech cap 308 (which itself can form part of the breech 306). In the illustrated embodiment, the breech cap 308 can be selectively opened in order to remove and replace the pyrotechnic cartridge 302, e.g., after depletion of the propellant and between flights. The breech 306 is operatively coupled to an electrical connector 310 that is configured to receive an ignition signal, e.g., from a pilot of the aircraft 10, a controller on board the aircraft 10, or remotely. The ignition signal initiates an ignitor 312 (e.g., an electro-explosive device, an electrical ignition device, a firing pin, or the like), which in turn ignites the propellant 304 within the pyrotechnic cartridge 302. This ignition of the propellant 304 causes an exothermic reaction that generates hot expanding gases 314 within the pressure vessel formed by the breech 306 and breech cap 308. Some embodiments include a mechanical ignitor 312, either as an alternative or backup to the ignitor 312. Such embodiments include a firing pin or similar mechanical ignition device disposed on or proximal to the breech 306.

Piping 316 channels the expanding gases from the breech 306 to the motor 100. Depending on the mounting location of the pyrotechnic unit 300, the piping 316 can have different forms. For example, in embodiments in which the pyrotechnic unit 300 and motor 100 have a fixed location relative to each other (e.g., both are mounted on the aircraft landing gear 12), the piping 316 can be a fixed/rigid exhaust piping. In other embodiments in which the relative positions of the pyrotechnic unit 300 and the motor 100 vary during takeoff or flight, the piping 316 is a flexible piping. Such flexible piping advantageously enables relative movement of the motor 100 and the pyrotechnic unit 300, e.g., in embodiments in which the pyrotechnic unit 300 is located centrally on the aircraft fuselage and the motor 100 is located on the landing gear 12. Representative piping 316 includes high temperature-resistant flexible exhaust ducting, rigid exhaust piping, articulating exhaust joints, and the like. Although the piping 316 is shown as part of the pyrotechnic unit 300 in FIG. 8, it may at least partially form part of the motor 100 in some embodiments.

A relief valve 318 is fitted to the piping 316 and configured to vent any excess gases produced by the pyrotechnic cartridge 302 which cannot be consumed by the motor 100 (as described below). In the illustrated embodiment, the relief valve 318 is positioned upstream of an optional gas connector 320 (e.g., a flanged exhaust fitting) which pneumatically connects the piping 316 to the motor 100. However, in some embodiments, the relief valve 318 and gas connector 320 have different relative positions. For example, in some embodiments, the relief valve 318 is located downstream of the gas connector 320; in such embodiments, the relief valve 318 and at least a portion of the piping 316 form part of the motor 100. As another example, the gas connector 320 is disposed at an upstream end of the piping 316 (e.g., where the piping 316 meets the breech 306 or breech cap 308; accordingly, the relief valve 318 is also disposed downstream of the piping 316 in such embodiments.

The motor 100 connects with the pyrotechnic unit 300 via the piping 316, e.g., at the gas connector 320. As noted above, the motor 100 is configured to utilize the expanding gases 314 from the pyrotechnic unit 300 to create rotary motion, and thus to rotatably drive the wheel 20. That is, the motor 100 utilizes an expansion vane motor, a turbine, or similar rotary motor to create torque to drive the wheel 20.

Figure 9:
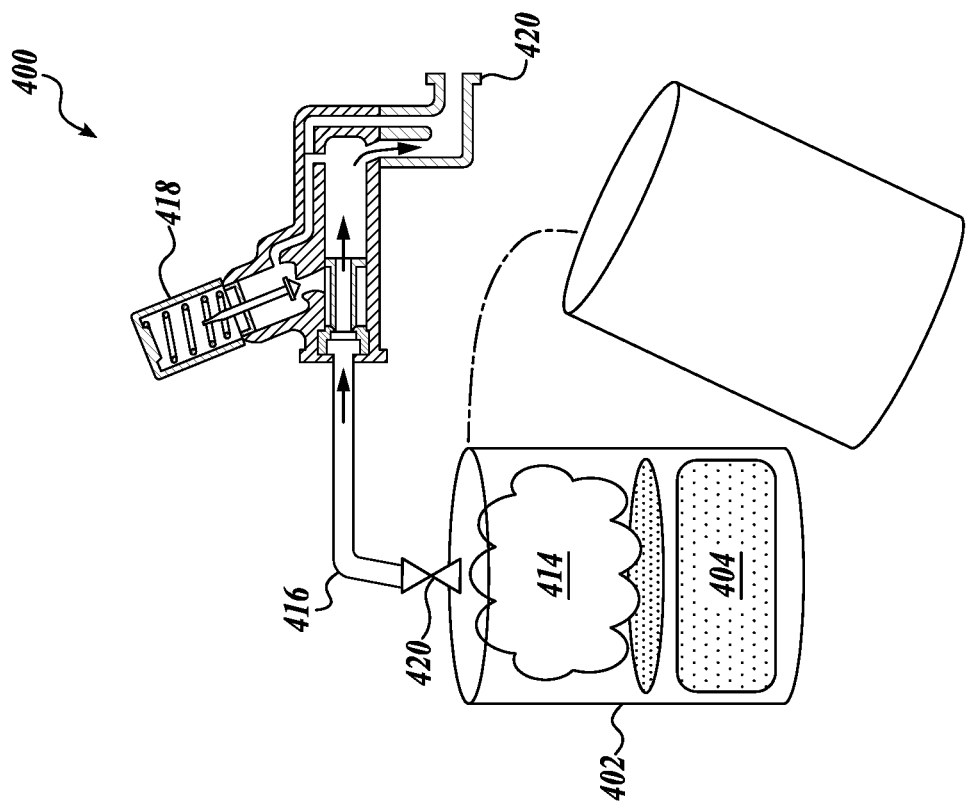
FIG. 9 shows a schematic view of another embodiment of the compressed gas source shown in FIG. 2.

FIG. 9 is a schematic diagram of another pyrotechnic unit 400 suitable for use as a compressed gas source 50 in accordance with another representative embodiment of the present disclosure. The pyrotechnic unit 400 of FIG. 9 is similar to that of FIG. 8 except as described below. For the sake of brevity, certain reference numerals introduced with respect to FIG. 8 are not reintroduced with respect to FIG. 9. Like elements are identified using reference numerals that are incremented by 100.

The pyrotechnic unit 400 of FIG. 9 is configured to minimize flying weight of the aircraft 10 following takeoff and after depletion of the propellant. This configuration described below avoids the undesirable need for the aircraft 10 to carry the pyrotechnic cartridge 402 after depletion of the propellant 404, when it is dead weight.

Whereas the pyrotechnic cartridge 302 of FIG. 8 is configured to be manually removed from the breech 306 between flights, e.g., by a ground crewmember, the pyrotechnic cartridge 402 of FIG. 9 is configured to be jettisoned following depletion of the propellant 404. In FIG. 9, the pyrotechnic unit 400 does not have a breech or a breech cap; rather, the pyrotechnic cartridge 402 forms its own pressure vessel which contains the propellant 404. Accordingly, the pyrotechnic cartridge 402 connects directly to the piping 416 at a gas connector 420, which can be a pyrotechnic fastener, an electromechanical connector, or the like.

Referring still to FIG. 9, in use, the pyrotechnic cartridge 402 is ignited prior to or during takeoff, which causes the motor 100 to deliver torque to the wheel 20. This process depletes the propellant 404, after which time the pyrotechnic cartridge 402 becomes dead weight. Therefore, the gas connector 420 releases (jettisons) the pyrotechnic cartridge 402 following takeoff, e.g., upon retraction of the landing gear 12 or upon receipt of a jettison signal from the pilot. As noted above, the gas connector 420 can release the pyrotechnic cartridge 402 by executing a pyrotechnic sequence (in the case of a pyrotechnic fastener), by releasing a latch (in the case of an electromechanical connector), or by a similar release process. Not only does this eliminate dead weight from the aircraft 10, but it also reduces the volume occupied by the pyrotechnic unit 400, which can enable retraction of the landing gear 12 into a landing gear bay.

Embodiments of the wheel acceleration system described above, particularly those that utilize pyrotechnic cartridges, are unlike and superior to electric taxi ("e-taxi") systems. First, the wheel acceleration systems are configured to provide much greater absolute torque and power outputs to the wheel, which is necessary to accelerate relatively heavy aircraft (e.g., 4,000 kg or greater) to takeoff speeds. For example, any of the wheel acceleration systems described herein can be configured to provide a torque output of at least 1500 Nm to wheel through the takeoff roll, resulting in a power output of at least 800 Kilowatts (e.g., 800-1,000 kW) at the end of the runway length or cartridge burn, which lasts from 5-10 seconds. Configurations providing greater torque and power outputs are contemplated. By comparison, known e-taxi systems are incapable of providing such high torque and power outputs.

The disclosed wheel acceleration systems, particularly those that utilize pyrotechnic cartridges, also provide much greater power densities than e-taxi systems. The superior power densities of the wheel acceleration systems described herein stem from reduced power source weight, reduced motor weight, absence or minimization of power controls systems, and/or absence or minimization of cooling systems. For example, pyrotechnic cartridges suitable for the wheel acceleration systems described herein (such as those based on the MXU-4A) could weigh approximately 15 kg, as compared to an approximately 140 kg supercapacitor that would be necessary to deliver a comparable power output. Further, the rotary motors described herein, such as pneumatic expansion vane motors, can weigh approximately 25% of electric motors having comparable power output. Further still, the wheel acceleration systems of the present disclosure do not require cumbersome electronic control systems that would be necessary for e-taxi systems having comparable power output. Moreover, given the low duty cycle and short burn times of the wheel acceleration systems described herein, liquid cooling systems are not necessary. In addition, the ability to jettison the spent container reduces the volume necessary to accommodate the wheel acceleration system and also reduces weight and improves aircraft performance.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The invention claimed is:

1. A motor for applying a rotational force to a wheel, the wheel having a rim rotatably mounted to an axle about a first axis, the motor comprising:
   a rotor coupled to the rim and having an interior cavity and a plurality of radial slots,
   a cylindrical stator disposed within the cavity and having a second axis offset from the first axis, the stator being fixed in rotation relative to the axle;
   a plurality of vanes, each vane being slidably disposed within one of the plurality of radial slots; and
   a compressed gas source in fluid communication with the cavity, wherein the compressed gas source selectively provides compressed gas to the cavity to rotate the rotor.

2. The motor of claim 1, wherein the cavity comprises a cylindrical surface coaxial with the first axis.

3. The motor of claim 1, wherein each vane is configured to maintain contact with the stator.

4. The motor of claim 3, wherein the plurality of vanes divide the cavity into a plurality of chambers, each chamber being fluidly isolated from the other chambers.

5. The motor of claim 1, wherein the stator comprises an inlet in fluid connection with the compressed gas source and the cavity.

6. The motor of claim 4, wherein the stator comprises at least one outlet configured to exhaust the compressed gas from the cavity.

7. The motor of claim 1, wherein the compressed gas source comprises a pyrotechnic unit configured to generate expanding gases by combusting a propellant.

8. The motor of claim 7, wherein the propellant is contained in a pyrotechnic cartridge configured to be jettisoned after the propellant is combusted.

9. The motor of claim 1, wherein the rotor comprises a plurality of external rotor splines engaging a plurality of internal rim splines formed on the rim.

10. The motor of claim 9, wherein the stator comprises a plurality of internal splines engaging a plurality of external axle splines formed on the axle.

11. The motor of claim 1 wherein the stator is positioned between an annular inboard stator plate and an annular outboard stator plate, the inboard stator plate and outboard stator plate being configured to be fixed in rotation relative to the first axis.

12. The motor of claim 11, wherein the rotor is positioned between an annular inboard rotor plate and an annular outboard rotor plate, the inboard rotor plate and outboard rotor plate being configured to rotate about the first axis with the rim, wherein the inboard rotor plate surrounds the inboard stator plate, and the outboard rotor plate surrounds the outboard stator plate.

13. The motor of claim 12, wherein the inboard rotor plate sealingly engages the inboard stator plate, and the outboard rotor plate sealingly engages the outboard stator plate.

14. The motor of claim 1, wherein the vanes are positioned between an inboard edge and an outboard edge of the rim.

15. An aircraft, comprising:
   the motor according to claim 1; and
   a landing gear with the wheel having the rim rotatably mounted to the axle about the first axis.

* * * * *